(12) United States Patent
Davidsson

(10) Patent No.: US 7,458,437 B2
(45) Date of Patent: Dec. 2, 2008

(54) ARRANGEMENT IN A FOUR-WHEEL DRIVE MOTOR VEHICLE

(75) Inventor: Per-Olof Davidsson, Limhamn (SE)

(73) Assignee: Haldex Traction AB (SE)

(*) Notice: Subject to any disclaimer, the term of this patent is extended or adjusted under 35 U.S.C. 154(b) by 0 days.

(21) Appl. No.: 11/455,551

(22) Filed: Jun. 19, 2006

(65) Prior Publication Data
US 2006/0231316 A1 Oct. 19, 2006

Related U.S. Application Data
(63) Continuation of application No. PCT/SE2004/001900, filed on Dec. 20, 2004.

(30) Foreign Application Priority Data
Dec. 22, 2003 (SE) .................................. 0303484

(51) Int. Cl.
B60K 17/34 (2006.01)
(52) U.S. Cl. ................ 180/233; 180/247; 180/248; 180/249; 180/250
(58) Field of Classification Search ............ 180/233, 180/244, 245, 248
See application file for complete search history.

(56) References Cited

U.S. PATENT DOCUMENTS

| | | | | |
|---|---|---|---|---|
| 3,580,350 A | * | 5/1971 | Arkus-Duntov | 180/248 |
| 4,650,028 A | * | 3/1987 | Eastman et al. | 180/233 |
| 4,763,747 A | * | 8/1988 | Muller | 180/244 |
| 4,885,957 A | * | 12/1989 | Taureg et al. | 475/89 |
| 4,923,029 A | | 5/1990 | Lanzer | 180/248 |
| 4,966,249 A | * | 10/1990 | Imaseki | 180/233 |
| 4,966,250 A | * | 10/1990 | Imaseki | 180/233 |
| 5,058,700 A | * | 10/1991 | Shibahata | 180/245 |
| 5,103,690 A | * | 4/1992 | Macpherson et al. | 74/665 GB |
| 5,199,325 A | * | 4/1993 | Reuter et al. | 74/335 |
| 5,562,192 A | * | 10/1996 | Dick | 192/84.1 |
| 6,145,614 A | | 11/2000 | Kimura et al. | 180/248 |
| 6,208,929 B1 | * | 3/2001 | Matsuno et al. | 701/89 |

FOREIGN PATENT DOCUMENTS

WO WO 97/04245 2/1997

OTHER PUBLICATIONS

International Search Report, Mar. 8, 2005, 2 pages.

* cited by examiner

Primary Examiner—Joanne Silbermann
Assistant Examiner—Michael R Stabley
(74) Attorney, Agent, or Firm—St. Onge Steward Johnston & Reens LLC

(57) ABSTRACT

In a four-wheel drive motor vehicle with a primary drive axle and a secondary drive axle, at least one secondary drive axle coupling of the limited slip type is provided in the powertrain between the engine of the vehicle and the secondary drive axle. A primary drive axle coupling of the limited slip type is provided for the primary drive axle.

9 Claims, 3 Drawing Sheets

ARRANGEMENT IN A FOUR-WHEEL DRIVE MOTOR VEHICLE

CROSS-REFERENCE TO RELATED APPLICATIONS

The present application is a continuation of pending International patent application PCT/SE2004/001900 filed on Dec. 20, 2004 which designates the United States and claims priority from Swedish patent application 0303484-0 filed on Dec. 22, 2003, the content of which is incorporated herein by reference.

FIELD OF THE INVENTION

The present invention relates to a four-wheel drive motor vehicle with a primary drive axle and a secondary drive axle, at least one secondary drive axle coupling of the limited slip type being provided in the powertrain between the engine of the vehicle and the secondary drive axle.

BACKGROUND OF THE INVENTION

Four-wheel drive motor vehicles are gaining popularity because of improved driving characteristics and safety and the possibility for the driver to drive more actively.

Such a motor vehicle is often based on a "normal" two-wheel drive design, either with front wheel drive or rear wheel drive. The driven axle may be called a primary drive axle.

The powertrain of the vehicle is supplemented with means transmitting engine power also to the other axle, called the secondary drive axle. A so called limited slip coupling is arranged in these power transmitting means to the secondary axle. The function of such a coupling is to reduce the difference in rotational speed between its ingoing shaft connected to the primary drive axle and its outgoing shaft connected to the secondary drive axle. This means that the engine power is distributed between the two vehicle axles depending on road and driving conditions.

A good example of such a limited slip coupling is shown in EP-B-0 837 998, to which reference is made. This coupling is a hydraulic, lamella type coupling and is electronically controlled, which means that the characteristics of the coupling may be very accurately controlled (together with other systems in the motor vehicle) for obtaining desired conditions.

Couplings with other designs may be used in four-wheel drive motor vehicles.

However, four-wheel drive motor vehicles with such a limited slip coupling may under certain conditions have a weakness in its driving characteristics (even with an electronically controlled coupling). The weakness stems from the fact that the secondary drive axle cannot rotate faster than the primary drive axle, but at most quite as fast (which occurs when the coupling is locked). The reasoning is based on a ratio in the coupling of 1:1.

This weakness or limitation leads to the following results:

Primary Front-Wheel Drive Motor Vehicles

In sporty motor vehicles it is desired that a forceful acceleration in a curve shall result in limited oversteering in certain cases. In order to obtain this, it is required that the lateral stiffness of the rear tires is clearly lower than that of the front tires. This may be obtained in that the longitudinal slip of the rear tires, which is an effect of transmitted drive moment, is significantly higher than that of the front tires.

In a present four-wheel drive system, this desired behaviour cannot be obtained, as the rear axle cannot rotate faster than the front axle.

Primary Rear-Wheel Drive Motor Vehicles

When a motor vehicle runs into unwanted oversteer, a four-wheel drive system could be able to assist in decreasing the oversteer by decreasing the lateral stiffness of the front axle. This could be accomplished by accelerating the front axle, so that it rotates considerably faster than the rear axle.

SUMMARY OF THE INVENTION

An improved situation in these regards is according to the invention obtained in that a primary drive axle coupling of the limited slip type is provided for the primary drive axle.

By the solution according to the invention it is generally speaking possible—by proper control of the two couplings in relation to each other—to give the secondary drive axle a higher rotational speed than the primary drive axle, so that the above noted weakness or limitation can be removed.

A desirable control speed and accuracy can be obtained if the secondary and primary drive axle couplings are electronically controlled, preferably by a common control system.

This control system is preferably connected to or integrated in other electronic control systems in the vehicle, for example for controlling braking and traction and possibly other parameters, as is well known in the art.

In a primary front-wheel drive vehicle with a transverse engine, the primary drive axle coupling can in a practical case be arranged in conjunction with one of the two front half-axles.

In a primary front-wheel drive vehicle with a longitudinal engine, the primary drive axle coupling can in a practical case be arranged at an outgoing shaft of a gear box.

In this latter case, the secondary drive axle coupling can be axially directly connected to the primary drive axle coupling.

As an especially advantageous modification of the arrangement in a primary front-wheel drive vehicle, the secondary drive axle coupling arrangement for the rear drive axle can be in the form a secondary drive axle coupling in each rear drive half-axle, driven from a longitudinal cardan shaft via a bevel gear. This so called double-coupling arrangement means that different drive moments can be applied to the two rear wheels and that the control authority is enhanced.

In a primary rear-wheel drive vehicle, the primary drive axle coupling can in a practical case be arranged in conjunction with a transfer case for transferring engine power to the front drive axle.

BRIEF DESCRIPTION OF THE DRAWINGS

The invention will be described in further detail below under reference to the accompanying drawings, in which.

DETAILED DESCRIPTION OF THE INVENTION

Figure 1:
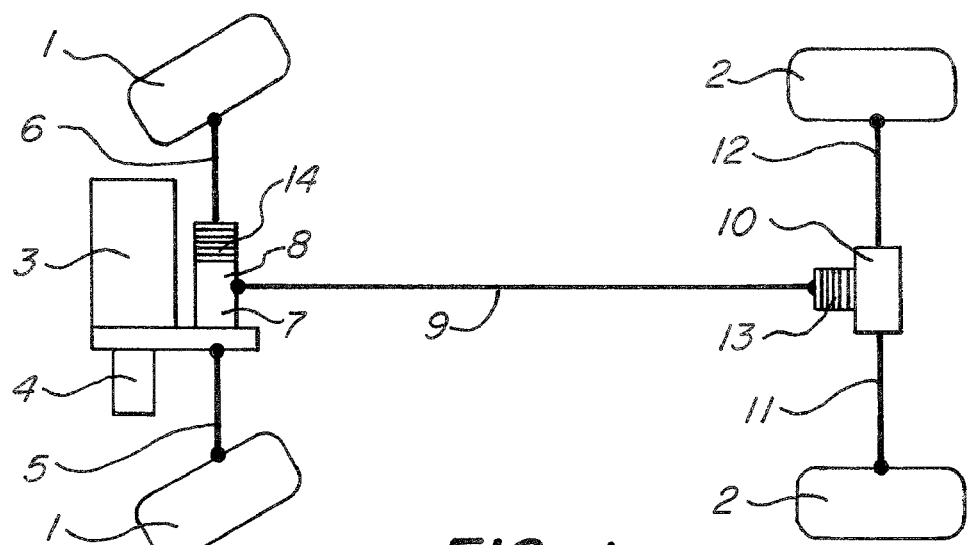
FIG. 1 is a schematical top view of a powertrain of a first four-wheel drive motor vehicle with an arrangement according to the invention.

FIG. 1 shows the general arrangement of the powertrain of a four wheel drive motor vehicle having its primary driving on its steerable front wheels 1 and its secondary driving on its rear wheels 2.

Figure 2:
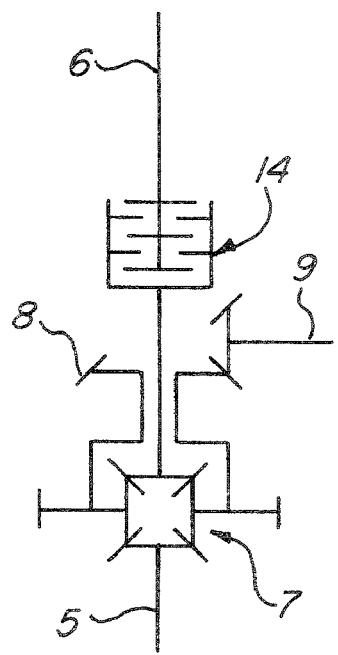
FIG. 2 is a diagram of a portion of the powertrain of the motor vehicle shown in FIG. 1, FIG. 3 corresponds to FIG. 1 and shows the powertrain of a second motor vehicle with an arrangement according to the invention.

A transversely arranged engine 3 with a gear box 4 can drive the front wheels 1 via a left front half-axle 5 and a right front half-axle 6 (together forming the front axle 5, 6) via a conventional differential 7 (FIG. 2).

Also—and secondarily—the rear wheels 2 can be driven by the engine 3 via a bevel gear 8 (FIG. 2), a longitudinal cardan shaft 9, a conventional differential 10, a left rear half-axle 11 and a right rear half-axle 12 (together forming the rear axle 11, 12).

In four-wheel drive motor vehicles it is state of the art to introduce a limited slip coupling between the primary and the secondary drive axles for distributing the driving force between the two axles. This coupling may be hydraulic, and in a specific case it may be electronically controlled; such a coupling is for example disclosed in EP-B-0 837 998, to which reference is made for a more detailed knowledge about this coupling and its function.

Such a coupling for the secondary drive axle, the rear axle 11, 12, has the reference numeral 13 and is here placed in conjunction with the rear differential 10; in principle it may be placed anywhere along the cardan shaft 9.

So far the shown and described drive arrangement is state of the art.

Even if such a drive arrangement has great advantages with regard to safety and driving characteristics for four-wheel drive motor vehicles, there are still certain weaknesses. These weaknesses are due to the fact that inherently the secondary drive axle cannot rotate with a higher speed than the primary drive axle but only at most with the same speed, which occurs when there is no slip at all in the coupling (which preferably is of the lamella type). The effect of this weakness or inherent limitation is discussed above under the heading "background of the invention".

The general remedy for the weakness or limitation is according to the invention to provide a second, primary drive axle coupling for the primary drive axle of the motor vehicle. By partly or fully opening this primary drive axle coupling, the secondary drive axle can be imparted a faster rotation than the primary one, when that is desirable.

In the drive arrangement shown in FIG. 1, such a primary drive axle coupling 14 is arranged between the bevel gear 8 and the right front half-axle 6. Such a position has the advantage that the basic design of the powertrain is not affected and that this coupling 14 can be optionally added.

By controlling the torque transmission to the front wheel 1 by means of the coupling 14 (including totally breaking the transmission by completely opening the coupling) the desired effect may be obtained. The front axle differential 7 will namely distribute the torque evenly to the two front wheels 1. A further advantage is that the coupling 14 only needs to be dimensioned to handle half the torque in comparison to the case that it should control the torque to both the front wheels 1.

Figure 3:
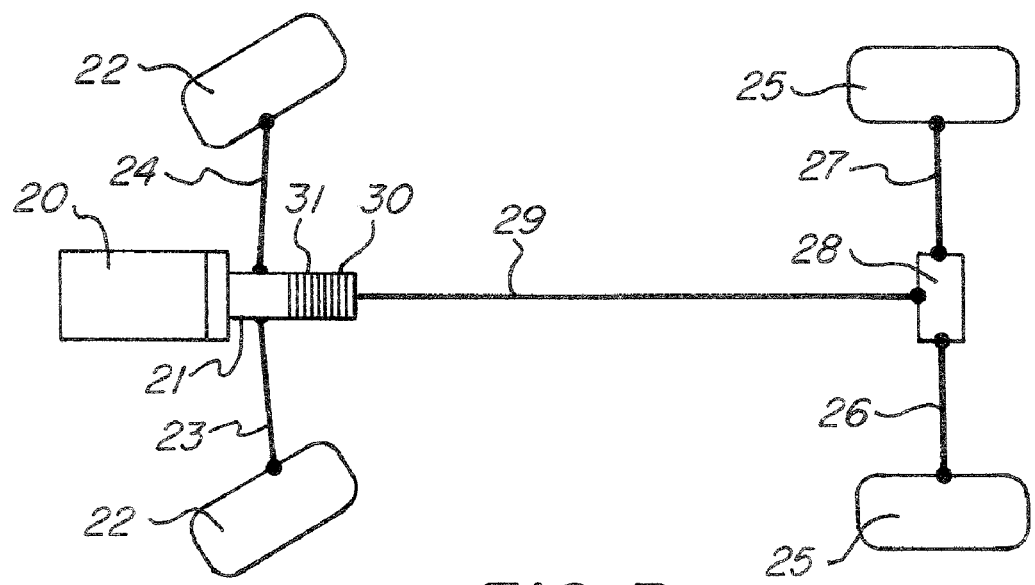
Figure 4:
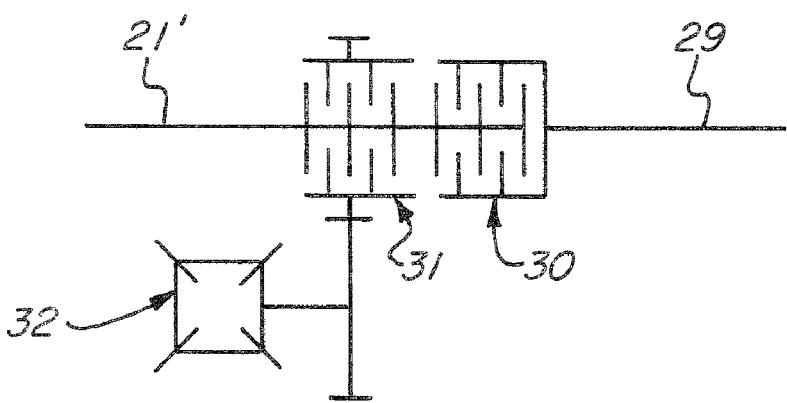
FIG. 4 is a diagram of a portion of the powertrain of the motor vehicle shown in FIG. 3, FIG. 5 corresponds to FIG. 1 and shows a third motor vehicle with an arrangement according to the invention.

A second drive arrangement with a primary front wheel drive powertrain is shown in FIGS. 3 and 4. A longitudinally arranged engine 20 with a gear box 21 primarily drives steerable front wheels 22 via a left front half-axle 23 and a right front half-axle 24.

Also its rear wheels 25 are secondarily driven via a left rear half-axle 26, a right rear half-axle 27, a rear differential 28 and a cardan shaft 29. A secondary drive axle coupling 30 is arranged in the vicinity of the gear box 21. This arrangement is state of the art.

A primary drive axle coupling 31 is according to the invention additionally arranged between the gear box 21 and the secondary drive axle coupling 30 (or the cardan shaft 29, if the secondary drive axle coupling has an alternative position in the powertrain).

The arrangement is also shown in FIG. 4, where an outgoing shaft from the gear box 21 has reference numeral 21'. In the shown way the torque from the primary drive axle coupling 31 is transferred to a front differential 32 for further transmission to the front wheels 22. The two couplings—the primary drive axle coupling 31 and the secondary drive axle coupling 31—are separately, electronically controlled.

Figure 5:
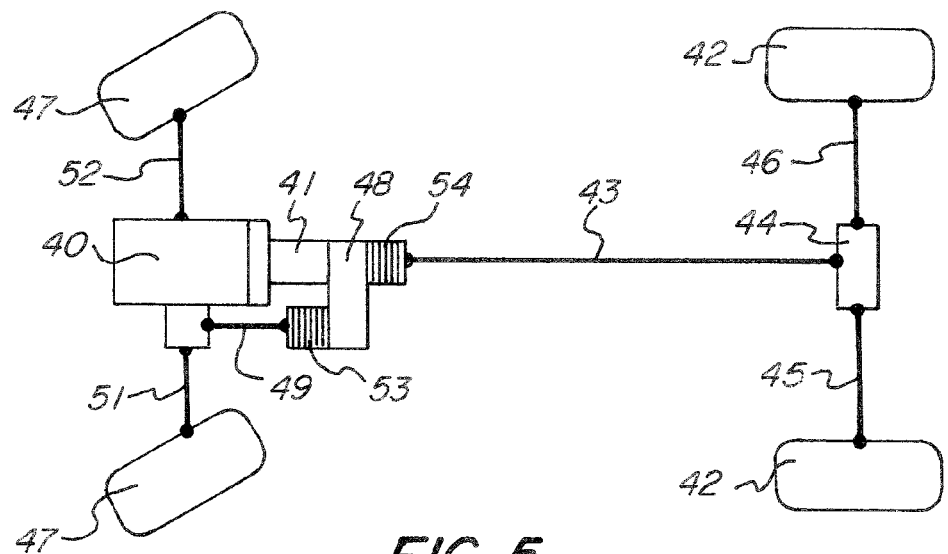

FIG. 5 illustrates a primary rear axle drive powertrain. A longitudinally arranged engine 40 with a gearbox 41 primarily drives rear wheels 42 via a cardan shaft 43, a conventional differential 44, and a left rear half-axle 45 and a right rear half-axle 46.

Also the steerable front wheels 47 are secondarily driven via a transfer case 48, a front drive shaft 49, a differential 50, and a left rear half-axle 51 as well as a right rear half-axle 52.

In the force transmission path to the front wheels 47, preferably mounted in or on the transfer case 48, a secondary drive axle coupling 53 is arranged.

So far the arrangement is state of the art.

According to the invention there is a primary drive axle coupling 54 in the force transmission path to the rear wheels 42, preferably mounted in or on the transfer case 48.

Figures 6, 7:
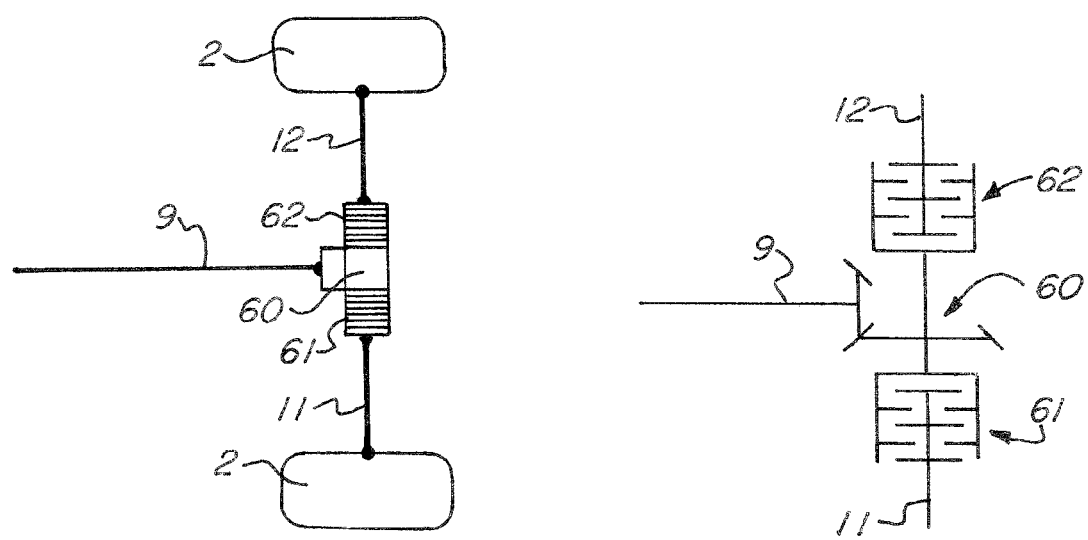
FIG. 6 is a schematical view of the rear part of a powertrain of a fourth motor vehicle with an inventive arrangement, being a modification of the arrangements shown in FIGS. 1 and 3.
FIG. 7 is a diagram of a portion of the motor vehicle powertrain partly shown in FIG. 6.

FIGS. 6 and 7 illustrate a modification or development of a powertrain for a primary front-wheel drive motor vehicle, as is shown in FIGS. 1-4. For the powertrain as such reference numerals from the embodiment of FIG. 1 are used, namely the secondary driven rear wheels 2, the cardan shaft 9, and the left rear half-axle 11 as well as the right rear half-axle 12.

The conventional differential 10 shown in FIG. 1 with its preceding secondary drive axle coupling 13 is here substituted by an arrangement with a bevel gear 60 and two secondary drive axle couplings 61 and 62, one for each of the respective half-axles 11 and 12. The arrangement can be labeled a secondary drive axle double coupling 60-62.

By active electronic control of each of these couplings 61, 62, the control authority of the system can be enhanced, in that an active yaw moment may be induced on the vehicle. Different drive moments may namely be applied to the two secondarily driven rear wheels 2.

Modifications are possible within the scope of the appended claims.

What is claimed is:

1. A four wheel drive motor vehicle, comprising:
   an engine;
   a primary axle having two halves;
   a secondary axle having two halves;
   a primary axle coupling disposed between said engine and said primary axle which varies an amount of torque transmitted from said engine to said primary axle;
   a primary axle differential which distributes the torque transmitted from said engine between the two halves of said primary axle;

a secondary axle coupling disposed between said engine and said secondary axle which varies an amount of torque transmitted from said engine to said secondary axle; and a secondary axle differential which distributes the torque transmitted from said engine between the two halves of said secondary axle.

2. The four wheel drive motor vehicle according to claim 1, wherein the secondary and primary axle couplings are electronically controlled by a common control system.

3. The four wheel drive motor vehicle according to claim 2, wherein the control system is connected to or integrated in other electronic control systems in the vehicle.

4. The four wheel drive motor vehicle according to claim 1 in a primary front-wheel drive vehicle with a transverse engine, wherein the primary axle coupling is arranged in conjunction with one of the two front half-axles.

5. The four wheel drive motor vehicle according to claim 1 in a primary front-wheel drive vehicle with a longitudinal engine, wherein the primary axle coupling is arranged at an outgoing shaft of a gear box.

6. The four wheel drive motor vehicle according to claim 5, wherein the secondary axle coupling is axially directly connected to the primary axle coupling.

7. The four wheel drive motor vehicle according to claim 4, wherein the secondary axle coupling arrangement for the rear drive axle is in the form of a secondary axle coupling in each rear half-axle, driven from a longitudinal cardan shaft via a bevel gear.

8. The four wheel drive motor vehicle according to claim 1 in a primary rear-wheel drive vehicle, wherein the primary axle coupling is arranged in conjunction with a transfer case for transferring engine power to the front axle.

9. The four wheel drive motor vehicle according to claim 5, wherein the secondary axle coupling arrangement for the rear axle is in the form of a secondary axle coupling in each rear half-axle, driven from a longitudinal cardan shaft via a bevel gear.

* * * * *